United States Patent
Kim et al.

(10) Patent No.: US 7,243,932 B2
(45) Date of Patent: Jul. 17, 2007

(54) MOUNTING STRUCTURE OF STABILIZER BAR IN VEHICLE

(75) Inventors: Sung-Dae Kim, Yongin-si (KR); Hyun-Soo Kim, Incheon Metropolitan (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 81 days.

(21) Appl. No.: 11/299,711

(22) Filed: Dec. 12, 2005

(65) Prior Publication Data
US 2006/0125202 A1 Jun. 15, 2006

(30) Foreign Application Priority Data
Dec. 10, 2004 (KR) ............. 10-2004-0104130

(51) Int. Cl.
*B60G 21/055* (2006.01)
(52) U.S. Cl. .............................. 280/124.107
(58) Field of Classification Search ......... 280/124.106, 280/124.107, 124.152; 267/293, 140.12
See application file for complete search history.

(56) References Cited
U.S. PATENT DOCUMENTS

| | | | | |
|---|---|---|---|---|
| 4,880,318 A | * | 11/1989 | Shibahara et al. | .......... 384/125 |
| 5,678,845 A | * | 10/1997 | Stuart | ................. 280/124.116 |
| 6,854,750 B2 | * | 2/2005 | Carlstedt et al. | ...... 280/124.169 |
| 2003/0111818 A1 | * | 6/2003 | Carlstedt et al. | ...... 280/124.169 |
| 2006/0082093 A1 | * | 4/2006 | Sterly et al. | .......... 280/124.106 |

FOREIGN PATENT DOCUMENTS

| | | | |
|---|---|---|---|
| EP | 1659010 A1 | * | 5/2006 |
| JP | 08244431 A | * | 9/1996 |

* cited by examiner

*Primary Examiner*—Faye M. Fleming
(74) *Attorney, Agent, or Firm*—Morgan Lewis & Bockius LLP

(57) ABSTRACT

A mounting structure of an automobile stabilizer bar includes a support bracket fixed at one end thereof to a lateral surface of a crossmember. The other end of the support bracket protrudes out toward the side of a vehicle body. At least one bushing is coupled to a stabilizer bar and affixed onto the support bracket. A bushing bracket is formed in an arch shape for enclosing the periphery of the bushing. A stud bolt is attached at one end to each outer surface of the bushing bracket. The other end of the stud bolt penetrates each lateral surface of the support bracket. A pipe member into which the stud bolt penetrates is coupled to each lateral surface of the support bracket. A coupling nut is coupled to one end of the stud bolt after the stud bolt passes through the pipe member.

6 Claims, 5 Drawing Sheets

_US 7,243,932 B2_

MOUNTING STRUCTURE OF STABILIZER BAR IN VEHICLE

CROSS-REFERENCE TO RELATED APPLICATIONS

The present application is based on, and claims priority from, Korean Application Serial Number 10-2004-0104130, filed on Dec. 10, 2004, the disclosure of which is hereby incorporated by reference herein in its entirety.

FIELD OF THE INVENTION

The present invention relates to a mounting structure of an automobile stabilizer bar adapted to prevent the stabilizer bar from being interfered with by neighboring components during its installation.

BACKGROUND OF THE INVENTION

The stabilizer bar is generally coupled at both ends to suspension arms (lower arms) via stabilizer links. The stabilizer bar is also connected at two middle portions thereof to the vehicle body via a bushing and bushing bracket.

Preferably, the bushing and bushing bracket can be coupled to the vehicle body without any interference from the neighboring components, and the attaching and detaching process thereof can be easily accomplished.

SUMMARY OF THE INVENTION

Embodiments of the present invention minimize the interference with the stabilizer bar by its adjacent components and improve the attachment and detachment of the stabilizer bar in the vehicle, thereby greatly reducing the time consumption of the working process.

A mounting structure of an automobile stabilizer bar includes a support bracket fixed at one end to a lateral surface of a crossmember. The other end of the support bracket is distanced from the lateral surface of the crossmember and protrudes out toward the side of the vehicle body. At least one bushing is coupled to the stabilizer bar and stably mounted to the support bracket. An arch-shaped bushing bracket encloses the periphery of the bushing. One end of each of a pair of stud bolts runs parallel to each outer surface of the bushing bracket. The other end of each stud bolt penetrates each lateral surface of the support bracket and protrudes downward therefrom. A pipe member into which the stud bolt penetrates is coupled to each lateral surface of the support bracket. A coupling nut is coupled to the bottom end of each stud bolt after the stud bolt passes through the pipe member.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
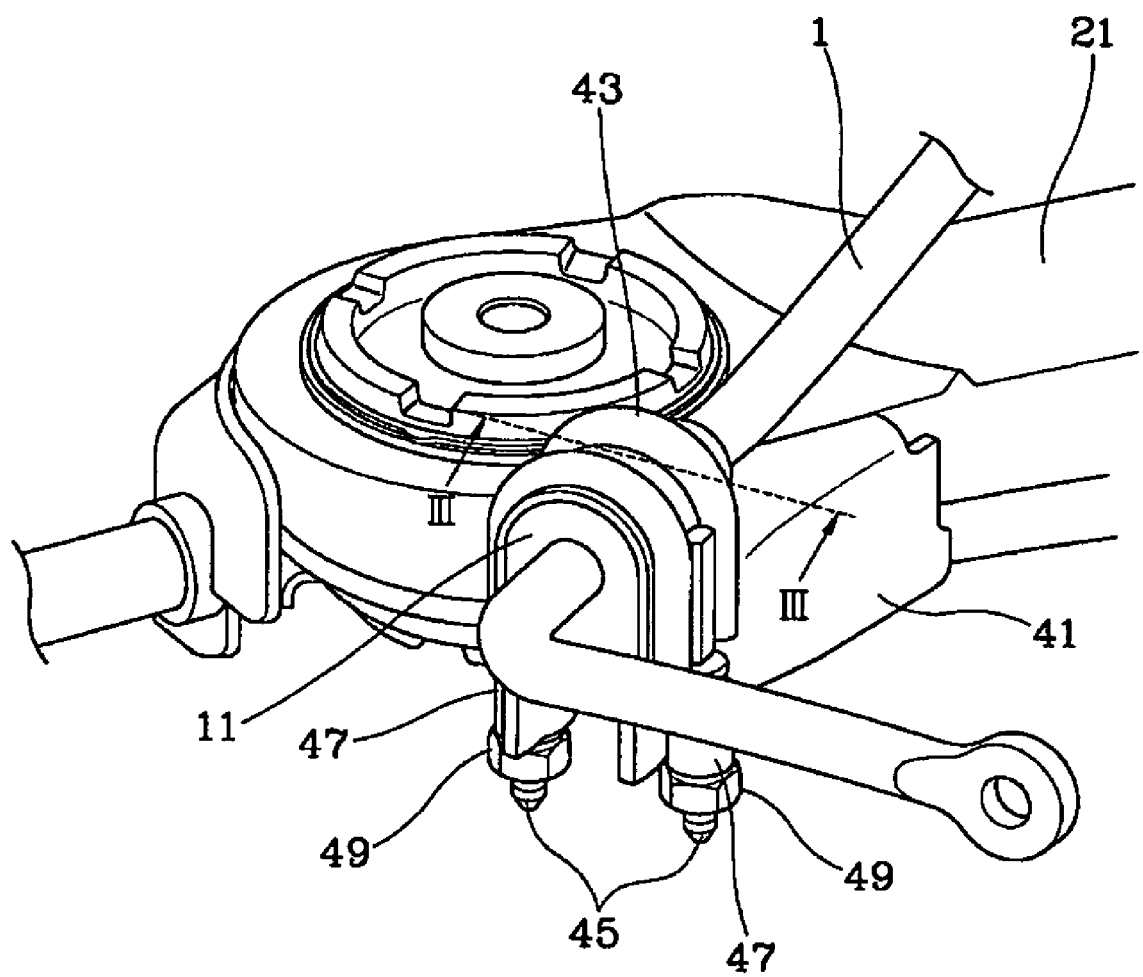
FIG. 1 is a perspective view illustrating a mounting structure of an automobile stabilizer bar according to an embodiment of the present invention.
Figure 2:
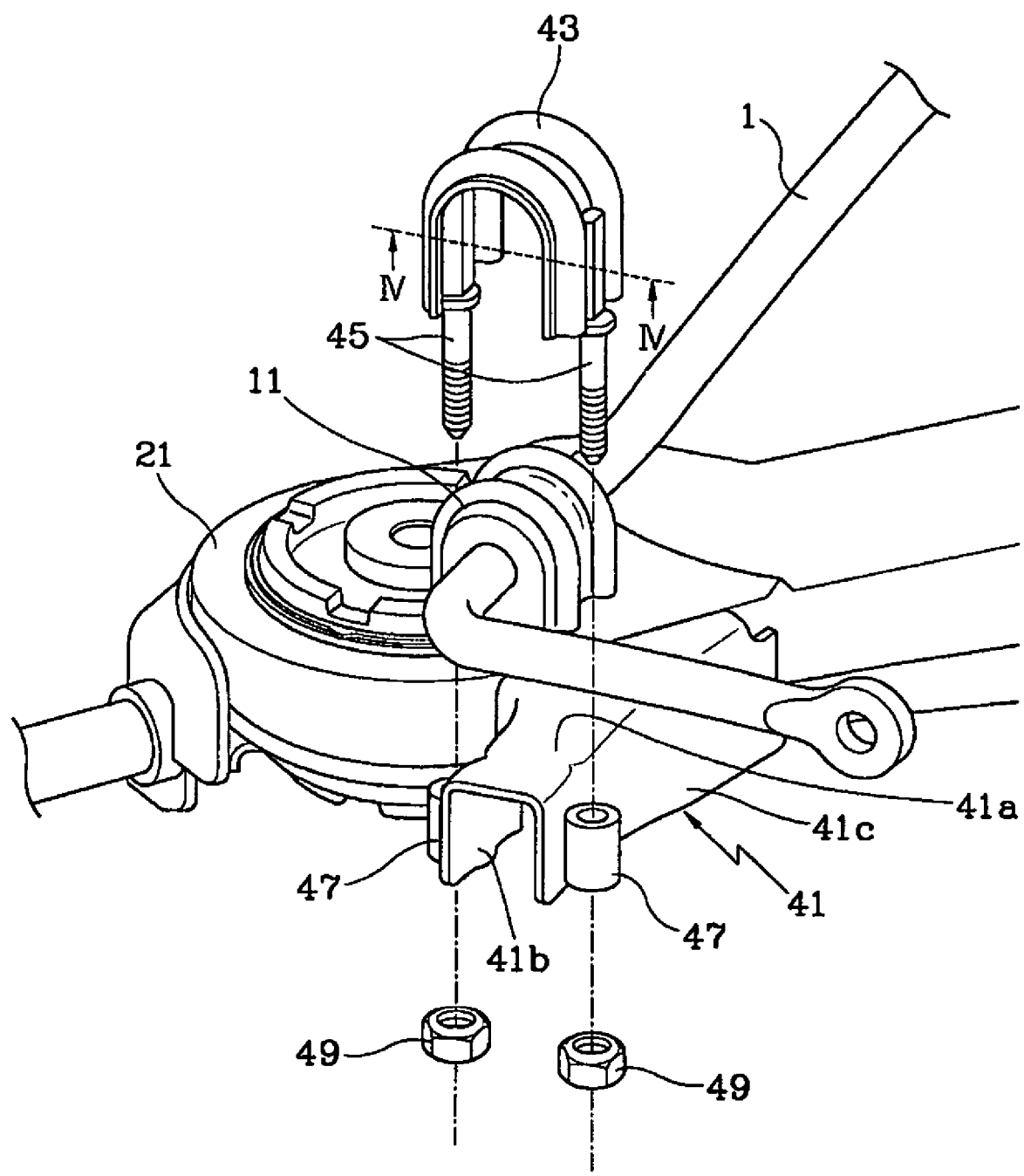
FIG. 2 is an exploded perspective view of FIG. 1.
Figure 3:
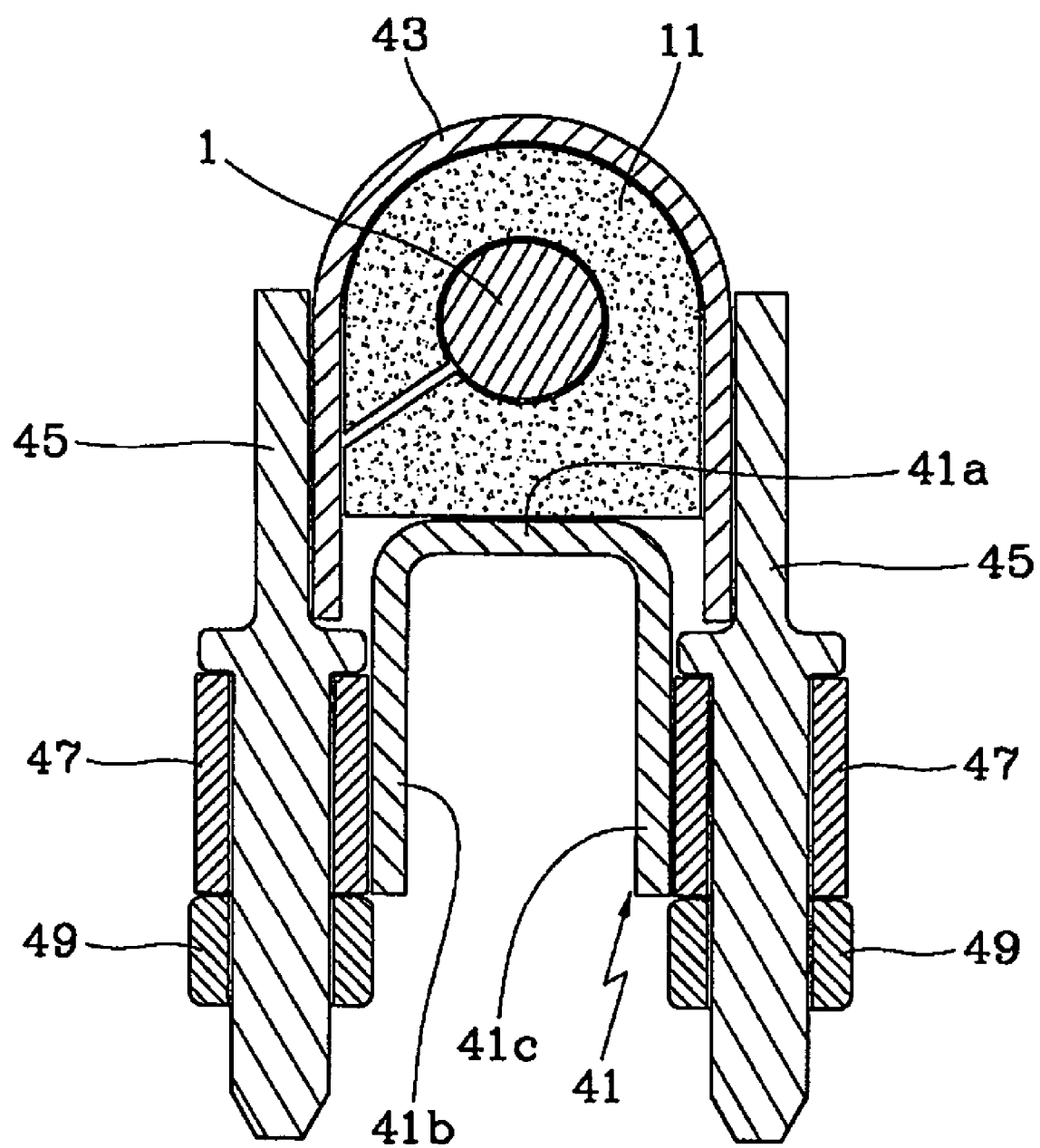
FIG. 3 is a cross-sectional view taken along line III-III of FIG. 1.

With reference to FIGS. 1 to 4, an embodiment of the present invention includes a support bracket 41 fixed at one end thereof to a lateral surface of a crossmember 21 while the other end is distanced from the lateral surface of crossmember 21 and protrudes out toward the side of a vehicle body. At least one bushing 11 is coupled to a stabilizer bar 1 and stably mounted to support bracket 41. A bushing bracket 43 has an arch shape for enclosing the periphery of bushing 11. A pair of stud bolts 45 has one end that runs adjacent to each outer surface of bushing bracket 43. The other end of stud bolts 45 penetrates each lateral surface of support bracket 41 and protrudes downward therefrom. A pipe member 47, into which stud bolt 45 penetrates, is coupled to each lateral surface of support bracket 41. A coupling nut 49 is coupled to the bottom end of each stud bolt 45 after stud bolt 45 passes through pipe member 47.

Crossmember 21 is installed underneath the vehicle body in the longitudinal direction thereof, thereby obtaining the rigidity of the lower portion of the vehicle body. Stabilizer bar 1 is fixed at two portions thereof to crossmember 21 via support bracket 41 equipped at both ends of crossmember 21. Both ends of stabilizer bar 1 are connected to suspension arms via stabilizer links. The connecting structure is not shown in the drawings.

Support bracket 41 branches out from crossmember 21 and includes an upper plate 41a onto which bushing 11 is mounted, and two side plates 41b and 41c. Side plates 41b and 41c are bent down toward the lower portion of the vehicle body from both lateral ends of upper plate 41a. Each outer surface of side plates 41b and 41c is welded to pipe member 47.

Figure 4:
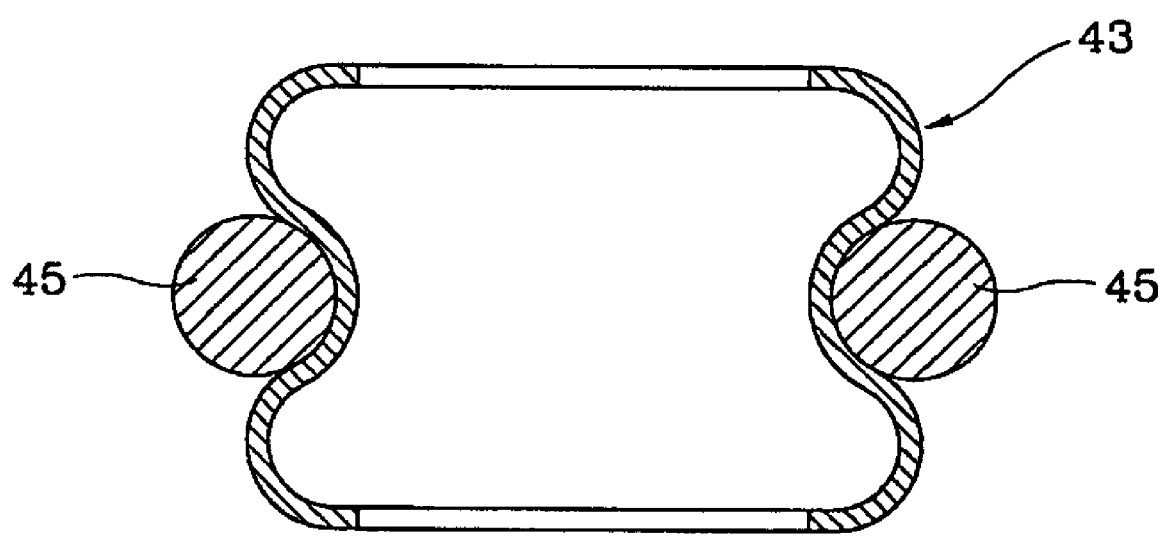
FIG. 4 is a cross-sectional view taken along line IV-IV of FIG. 2.

As illustrated in detail in FIG. 4, bushing bracket 43 has a wave-shaped cross section formed by connecting three arcs, alternatingly convex and concave. Stud bolt 45 is closely welded to the center of the middle arc among the above wave-shaped cross-section for a tight coupling of stud bolt 45 and bushing bracket 43.

The exterior of bushing 11, which is closely attached to the interior of bushing bracket 43, has a wave shape in accordance with the formation of bushing bracket 43, whereas the interior of bushing 11 is configured to be penetrated by stabilizer bar 1. Bushing 11 is mounted on support bracket 41 via bushing bracket 43 after stabilizer bar 1 has penetrated the interior of bushing 11.

When bushing 11 is fitted onto support bracket 41, the pair of stud bolts 45 coupled to bushing bracket 43 passes adjacent to both lateral sides of support bracket 41 and penetrates pipe member 47 welded to the both sides of support bracket 41. Coupling bolt 49 is coupled to one end of stud bolt 45 having passed through pipe member 47 so that bushing bracket 43 and support bracket 41 firmly couple to each other.

Therefore, stabilizer bar 1 is fixed to and supported by crossmember 21 via bushing 11, bushing bracket 43, support bracket 41, and coupling nut 49. When stabilizer bar 1 is fixed onto support bracket 41, the assembly has no portions that protrude at the lateral and upper portions of bushing 11 enclosing stabilizer bar 1, thus significantly reducing interference with the stabilizer bar by contiguous components thereof.

Bushing 11 is an essential element for fixing stabilizer bar 1 to the vehicle body, and thus, a certain space for accommodating bushing 11 should be obtained in the vehicle. However, in the mounting structure of the stabilizer bar according to the present invention, a minimal space is required at the lateral and upper portions of bushing 11, thereby minimizing the interference with bushing 11 by the adjacent components.

Figure 5:
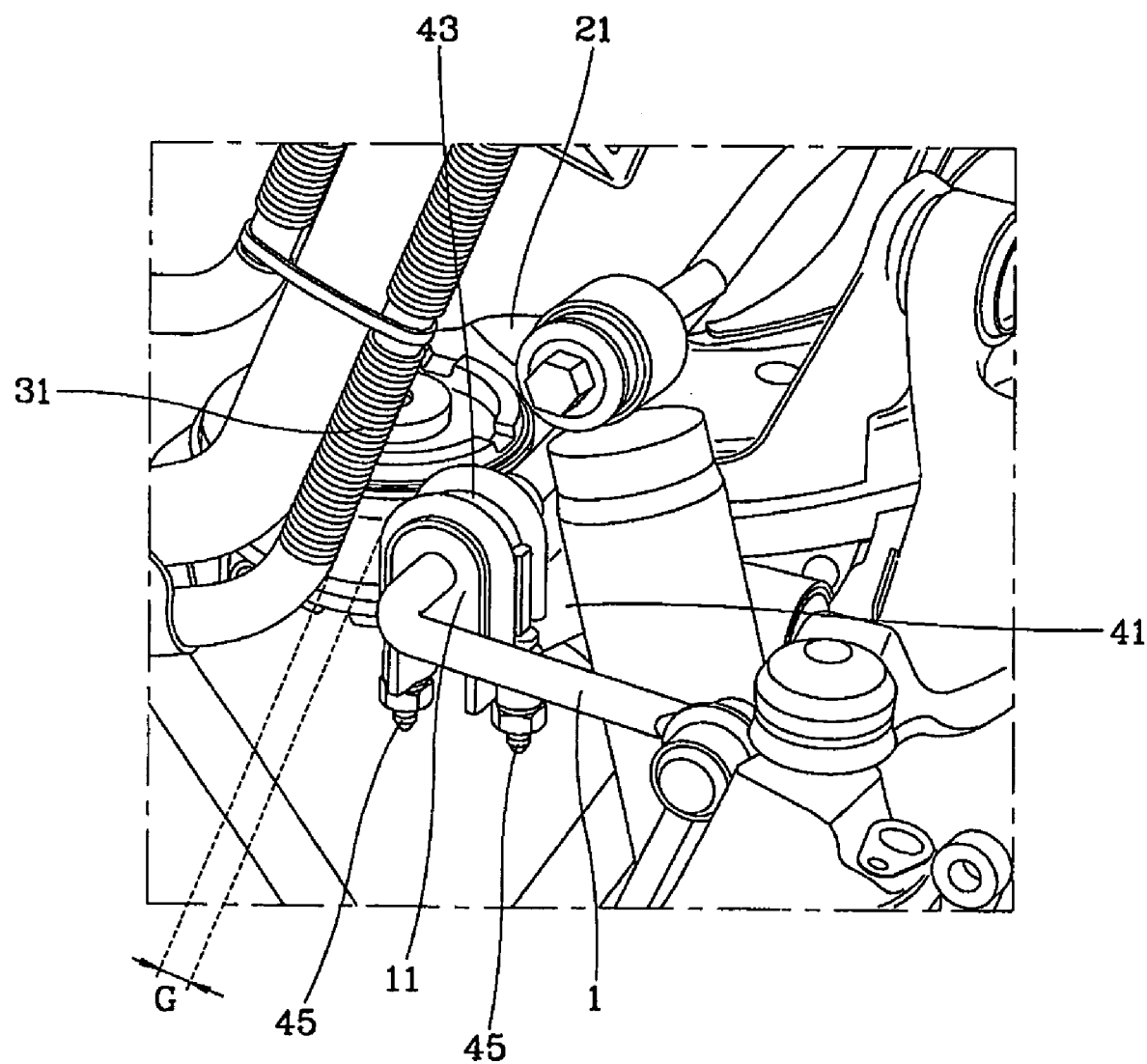
FIG. 5 is a view illustrating an embodiment of the present structure and its neighboring components in a vehicle.

In reference to FIG. 5, an interval (G) is acquired between bushing bracket 43 enclosing bushing 11 and a fuel filler pipe 31 adjacent to bushing 11 that supports stabilizer bar 1 to the vehicle body, so that fuel filler pipe 31 and bushing bracket 43 are prevented from being disturbed by each other.

In the present invention, the assembly and disassembly of bushing bracket 43 are implemented by manipulating coupling nut 49 that is fastened and unfastened from the lower portion of the vehicle body (that is, lower portion of bushing 11) without any restriction of the lateral or upper portions of bushing 11. This greatly improves the convenience of the assembly and disassembly of bushing bracket 43, significantly reduces the working time period, and increases the productivity thereby.

As apparent from the foregoing, there is an advantage in that the surrounding of the bushing enclosing the stabilizer bar is not limited in space when the stabilizer bar is installed at the vehicle body, thereby preventing any generation of interruption due to nearby components, facilitating the assembly and disassembly of the bushing bracket, significantly reducing the working time period, and increasing the productivity as well.

What is claimed is:

1. A mounting structure of an automobile stabilizer bar, comprising:
   a support bracket having a first end fixed to a lateral surface of a crossmember and a second end distanced from the lateral surface of said crossmember and protruding out toward a side of a vehicle body;
   at least one bushing coupled to a stabilizer bar and having a rounded top surface and a bottom surface, said bottom surface being stably mounted to said support bracket;
   at least one bushing bracket having an arch shape, which defines two lateral surfaces and a rounded inner surface that encloses the rounded top surface of said at least one bushing;
   at least a pair of stud bolts, each having a top end that is connected to a respective one of the lateral surfaces of said bushing bracket, a middle section, and a bottom end;
   at least a pair of pipe members coupled to said support bracket into each of which said middle section of a respective one of said stud bolts is disposed; and
   at least a pair of coupling nuts, each of which is coupled to the bottom end of a respective one of said stud bolts.

2. The structure as defined in claim 1, wherein said support bracket comprises:
   an upper plate onto which said bottom surface of said at least one bushing is stably mounted; and
   two side plates integrally formed with said upper plate and bent downward therefrom, each having an outer surface to which a respective one of said pipe members is coupled.

3. The structure as defined in claim 2, wherein said pipe members are welded to said outer surfaces of said side plates.

4. The structure as defined in claim 1, wherein each lateral surface of said bushing bracket has a wave-shaped cross section having two convex portions and a center concave portion, and the top end of a respective one of said stud bolts is connected to said center concave portion.

5. The structure as defined in claim 4, wherein the top end of said stud bolt is welded to said center concave portion of said bushing bracket.

6. The structure as defined in claim 4, wherein the rounded top surface of the bushing has a wave-shaped cross section.

* * * * *